(12) United States Patent
Tada (10) Patent No.: US 10,183,455 B2
(45) Date of Patent: Jan. 22, 2019

(54) METHOD FOR MANUFACTURING BAND-LIKE CUT MEMBER, AND DEVICE FOR CUTTING BAND-LIKE MEMBER

(71) Applicant: The Yokohama Rubber Co., LTD., Minato-ku, Tokyo (JP)

(72) Inventor: Hirotaro Tada, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/514,486

(22) PCT Filed: Sep. 25, 2015

(86) PCT No.: PCT/JP2015/077084
§ 371 (c)(1),
(2) Date: Mar. 24, 2017

(87) PCT Pub. No.: WO2016/047750
PCT Pub. Date: Mar. 31, 2016

(65) Prior Publication Data
US 2017/0274608 A1    Sep. 28, 2017

(30) Foreign Application Priority Data
Sep. 26, 2014   (JP) .................................. 2014-196469

(51) Int. Cl.
*B29D 30/46*    (2006.01)
*B26D 3/00*    (2006.01)
*B26D 5/00*    (2006.01)

(52) U.S. Cl.
CPC .............. *B29D 30/46* (2013.01); *B26D 3/00* (2013.01); *B26D 5/00* (2013.01); *B29D 2030/463* (2013.01); *B29D 2030/466* (2013.01)

(58) Field of Classification Search
CPC ............. B29D 30/46; B29D 2030/463; B29D 2030/466; B26D 3/00; B26D 5/00
(Continued)

(56) References Cited

U.S. PATENT DOCUMENTS 5,029,502 A * 7/1991 Irie ..................... B26D 1/185
                                                  83/486.1
2012/0111473 A1* 5/2012 Hasegawa ......... B29C 65/7847
                                                  156/64
(Continued)

FOREIGN PATENT DOCUMENTS

EP    1065043 A2 *  1/2001  .............. B29D 30/42
JP    2004-082392      3/2004
(Continued)

OTHER PUBLICATIONS

International Search Report for International Application No. PCT/JP2015/077084 dated Dec. 22, 2015, 4 pages, Japan.

*Primary Examiner* — Kenneth E. Peterson
*Assistant Examiner* — Nhat Chieu Do
(74) *Attorney, Agent, or Firm* — Thorpe North & Western (57) ABSTRACT

(N+1) band-like cut members are manufactured by cutting a band-like member N times along the length direction of the reinforcing cords. At such time, cutting positions are set at locations in the width direction of the band-like member from a first end toward a second end, and cuts are made in the band-like member on the basis of the cutting positions. Setting the cutting positions includes: a step A in which cutting positions of the band-like member are set M times (where M is a natural number less than N) for every fixed first number of reinforcing cords; and a step B in which a second number of the reinforcing cords is set within an allowable number range, and the cutting positions are set at (N−M) locations using the second number such that band-like cut members having the second number of reinforcing cords are continuously produced.

20 Claims, 4 Drawing Sheets (58) Field of Classification Search
USPC .................................................... 83/49–72
See application file for complete search history.

(56) References Cited

U.S. PATENT DOCUMENTS

| | | |
|---|---|---|
| 2014/0074758 A1 | 3/2014 | Amid et al. |
| 2014/0230205 A1 | 8/2014 | Smith et al. |

FOREIGN PATENT DOCUMENTS

| | | |
|---|---|---|
| JP | 2006-285381 | 10/2006 |
| JP | 2008-293315 | 12/2008 |
| JP | 2010-017793 | 1/2010 |
| JP | 2010-105204 | 5/2010 |
| JP | 2010105204 A * | 5/2010 |
| JP | 2011-088271 | 5/2011 |
| JP | 5168576 | 3/2013 |
| WO | WO 2013/048384 | 4/2013 |

\* cited by examiner

| TOTAL NUMBER | C01 - C20 | C21 | C22 | C23 | - |
|---|---|---|---|---|---|
| 245 (+5) OR GREATER | STOP AUTOMATIC OPERATION | | | | |
| 244 (+4) | 10 | 11 | 11 | 11 | 11 |
| 243(+3) | 10 | 10 | 11 | 11 | 11 |
| 242(+2) | 10 | 10 | 10 | 11 | 11 |
| 241(+1) | 10 | 10 | 10 | 10 | 11 |
| 240(±0) | 10 | 10 | 10 | 10 | 10 |
| 239(-1) | 10 | 10 | 10 | 10 | 9 |
| 238(-2) | 10 | 10 | 10 | 9 | 9 |
| 237(-3) | 10 | 10 | 9 | 9 | 9 |
| 236(-4) | 10 | 9 | 9 | 9 | 9 |
| 235 (-5) OR LESS | STOP AUTOMATIC OPERATION | | | | |

METHOD FOR MANUFACTURING BAND-LIKE CUT MEMBER, AND DEVICE FOR CUTTING BAND-LIKE MEMBER

TECHNICAL FIELD

The present technology relates to a method for manufacturing (N+1) band-like cut members by cutting a band-like member, in which a plurality of reinforcing cords are arranged mutually parallel and embedded in rubber, a predetermined number of times N (where N is a natural number) along the length direction of the reinforcing cords, and to a cutting device for a band-like member.

BACKGROUND ART

In tire structures, a belt reinforcing layer is sometimes provided while covering the outer periphery of a belt layer, thereby reinforcing the belt layer. The belt reinforcing layer is formed by taking a long, narrow band-like tire member, in which a plurality of reinforcing cords such as organic fiber cords or metal cords that are arranged mutually parallel are embedded, and wrapping that tire member multiple times around the outer periphery of the belt layer on an outer side of the belt layer of the tire in the tire radial direction. This long, narrow band-like member is one of N+1 band-like cut members obtained by cutting a wide band-like member a predetermined number of times N along the length direction of the reinforcing cords.

A cutting method and cutting device for obtaining such a band-like cut member is known (see, e.g., Japanese Patent No. 5168576B).

In this cutting method, an image capture device captures an image of cutting means capable of moving in a width direction of the band-like member along with a portion of the band-like member including a first end in the width direction at one end in the length direction of the band-like member. Furthermore, a position of each of the reinforcing cords appearing at the one end in the length direction of the band-like member and a position of the cutting means are detected in the image captured by the image capture device. The cutting means is then moved toward a second end of the band-like member in the width direction, to a position, in the captured image, where the cutting means can cut the band-like member at a position between a reinforcing cord located a predetermined number from the first end in the width direction of the band-like member and the next reinforcing cord thereafter. The cutting means then forms a cut in the one end in the length direction of the band-like member. Next, an image capture device stop range is set, in the captured image, on the first end side of the position of the cutting means in the width direction of the band-like member. The image capture device is then moved toward the second end side in the width direction of the band-like member until the position of the cutting means in the captured image enters the image capture device stop range. After that, the positions of the reinforcing cords appearing at the one end in the length direction of the band-like member are detected in the image captured by the image capture device, and the position of the cutting means is set. Furthermore, the cutting means is moved toward the second end side in the width direction of the band-like member until the cutting means is located at a position where the cutting means can cut the band-like member at a position between the reinforcing cord a predetermined number from the position at which the immediately preceding cut was formed and the next reinforcing cord thereafter, in the captured image. The cutting means then forms a cut in the one end in the length direction of the band-like member.

The band-like member is, for example, a member obtained by cutting a wide sheet material, in which reinforcing cords are embedded, every set width. Thus depending on how dense or sparse the reinforcing cords are, the number of reinforcing cords embedded in the band-like member may be greater or less than a set target number of reinforcing cords. As such, when the above-described cutting method is used to obtain the band-like cut member by cutting the band-like member with a consistent number of reinforcing cords, the number of reinforcing cords in the final band-like cut member obtained from the cutting will not be the target number of reinforcing cords, and the band-like cut member will thus not conform to specifications. Band-like cut members not conforming to specifications are discarded.

SUMMARY

The present technology provides a method for manufacturing a band-like cut member, and a cutting device for a band-like member, capable of suppressing a situation in which a band-like cut member obtained from a band-like member cannot be used as a constituent member of a structural member and is thus discarded, even in the case where the number of reinforcing cords embedded in the band-like member varies.

Embodiments of the present technology are methods for manufacturing a band-like cut member, and include the following.

Embodiment 1

A method for manufacturing a band-like cut member includes the steps of: setting N, where N is a natural number, cutting positions in a band-like member, the band-like member having a plurality of reinforcing cords arranged mutually parallel and embedded in rubber, from a first end toward a second end in a width direction of the band-like member, the width direction being orthogonal to a length direction of the plurality of reinforcing cords in the band-like member; and forming cuts in the band-like member on the basis of the cutting positions in order to produce (N+1) band-like cut members by cutting the band-like member along the length direction of the plurality of reinforcing cord at the N cutting positions. Here, the step of setting the cutting positions in the band-like member includes: a step A of setting M, where M is a natural number less than N, cutting positions in the band-like member every first number of the plurality of reinforcing cords that is a fixed number; and a step B of setting a second number within an allowable number range of the plurality of reinforcing cords that is predetermined and setting (N−M) cutting positions in the band-like member every the second number such that band-like cut members having the second number of reinforcing cords of the plurality of reinforcing cords are continuously produced.

Embodiment 2

The method according to embodiment 1, in which the cutting positions in the step B are set such that a number of reinforcing cords of the plurality of reinforcing cords present in a last band-like cut member produced from a part of the band-like member to which the step B is applied is the second number.

Embodiment 3

The method according to embodiment 1 or 2, further including the step of counting a total number of the plurality of reinforcing cords in the band-like member before setting the cutting positions in the band-like member. Here, the second number is set on the basis of a difference between a total number of the plurality of reinforcing cords embedded in the band-like member, and a product of the first number and the (N+1).

Embodiment 4

The method according to embodiment 1 or 2, in which the step A is carried out before the step B; and before the cutting positions are set in the band-like member, a number of reinforcing cords of the plurality of reinforcing cords embedded in a part of the band-like member to which the step B is applied is counted to find the number of reinforcing cords in the part, and the second number is set on the basis of the number of reinforcing cords found in the part.

Embodiment 5

The method according to any one of embodiments 1 to 4, in which the second number used in the step B is variable within an allowable number range, and some value of the second number is identical to the first number.

Embodiment 6

The method according to any one of embodiments 1 to 5, in which the second number used in the step B is variable within an allowable number range; and in the case where a number of reinforcing cords of the plurality of reinforcing cords in a part of the band-like member to which the step B is applied is greater than a product of N−M+1 and the first number, an initial value of the second number used to set a first cutting position in the step B is less than a number of reinforcing cords of the plurality of reinforcing cords present in a last band-like cut member produced as a result of the last cutting position in the step B being set.

Embodiment 7

The method according to any one of embodiments 1 to 5, in which the second number is variable within the allowable number range; and in the case where a number of reinforcing cords of the plurality of reinforcing cords in a part of the band-like member to which the step B is applied is less than the product of N−M+1 and the first number, an initial value of the second number used to set a first cutting position in the step B is greater than a number of reinforcing cords of the plurality of reinforcing cords present in a last band-like cut member produced as a result of the last cutting position in the step B being set.

Embodiment 8

The method according to any one of embodiments 1 to 5, in which the second number is variable within an allowable number range; and in the case where a difference between a number of reinforcing cords of the plurality of reinforcing cords in a part of the band-like member to which the step B is applied, and a product of N−M+1 and the first number, is not a multiple of N−M+1, an initial value of the second number used to set a first cutting position in the step B is different from a number of reinforcing cords of the plurality of reinforcing cords present in a last band-like cut member produced as a result of a last cutting position in the step B being set.

Embodiment 9

The method according to any one of embodiments 1 to 8, in which when k1 is a natural number greater than or equal to 2 and less than or equal to N−M−1 in the step B, the second number used to set the cutting positions from a first cutting position to the k1th cutting position in the step B is identical.

Embodiment 10

The method according to embodiment 9, in which in the step B, the second number used to set the cutting positions from the first cutting position to the k1th cutting position in the step B is identical to the first number.

Embodiment 11

The method according to embodiment 9 or 10, in which the k1 is set in accordance with a difference between a number of reinforcing cords of the plurality of reinforcing cords in a part of the band-like member to which the step B is applied, and a product of N−M+1 and the first number.

Embodiment 12

The method according to any one of embodiments 1 to 11, in which when k2 is a natural number greater than or equal to 1 and less than or equal to N−M−2 in the step B, values of the second number used to set the (k2+1)th and subsequent cutting positions are identical each other, but are different from a value of the second number used to set a first cutting position in the step B.

Embodiment 13

The method according to any one of embodiments 1 to 12, in which the step A is carried out before the step B, after the step B, or both before and after the step B.

Embodiment 14

The method according to any one of embodiments 1 to 13, in which a difference between the second number and the first number is less than or equal to 15% of the first number.

Embodiment 15

The method according to any one of embodiments 1 to 14, in which the M is a natural number greater than or equal to 50% of the N and less than or equal to 90% of the N.

Embodiment 16

The method according to any one of embodiments 1 to 15, in which in the step of forming cuts, the cutting positions are specified from an image of ends of the plurality of reinforcing cords on one end of the band-like member in the length direction of the band-like member, and a cutter is moved to the specified cutting positions.

Embodiment 17

The method according to any one of embodiments 1 to 16, in which a computer is caused to execute the step of setting the N cutting positions in the band-like member.

In each of these embodiments, the cutting positions in the step A and the cutting positions in the step B are preferably set before the cuts are formed in the band-like member.

Alternatively, cuts are preferably formed in locations of the band-like member corresponding to the cutting positions set in the step A after the cutting positions are set in the step A and cuts are preferably formed in locations of the band-like member corresponding to the cutting positions set in the step B after the cutting positions are set in the step B.

Further embodiments of the present technology are cutting devices for a band-like member, and include the following.

Embodiment 18

The cutting device for a band-like member includes: a setting unit configured to set N, where N is a natural number, cutting positions in a band-like member, the band-like member having a plurality of reinforcing cords arranged mutually parallel and embedded in rubber, from a first end toward a second end in a width direction of the band-like member, the width direction being orthogonal to a length direction of the plurality of reinforcing cords in the band-like member; and a cut forming mechanism configured to form cuts in the band-like member on the basis of the cutting positions in order to produce (N+1) band-like cut members by cutting the band-like member along the length direction of the plurality of reinforcing cord at the N cutting positions. Here, in order to set M, where M is a natural number smaller than N, cutting positions in the band-like member every first number of reinforcing cords of the plurality of reinforcing cords that is a fixed number, and in order to furthermore set a second number within an allowable number range of the plurality of reinforcing cords that is predetermined and set (N−M) cutting positions in the band-like member every the second number such that band-like cut members having the second number of reinforcing cords of the plurality of reinforcing cords are continuously produced, the setting unit holds a reference table that sets information of the M, as well as the first number and the second number for each of a total number of plurality of reinforcing cords in the band-like member.

Embodiment 19

The device according to embodiment 18, in which when (N−M+1) band-like cut members are produced from the (N−M) cutting positions, the setting unit sets the cutting positions in the step B such that a number of reinforcing cords of the plurality of reinforcing cords present in a last band-like cut member is the second number.

According to the method for manufacturing a band-like cut member and the cutting device for a band-like member described above, is it possible to suppress a situation in which a band-like cut member obtained from a band-like member cannot be used as a constituent member of a structural member such as a tire and is thus discarded, even in the case where the number of reinforcing cords embedded in the band-like member varies.

DETAILED DESCRIPTION

Figure 1A:
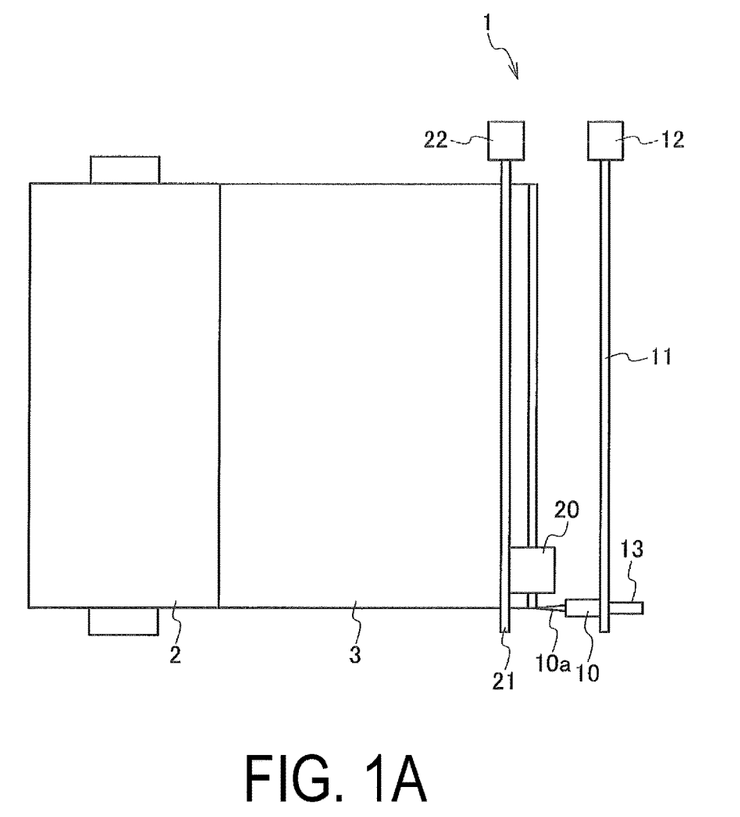
FIG. 1A is a plan view of a cutting device for a band-like member according to an embodiment, which is subject to a method for manufacturing a band-like cut member according to an embodiment.
Figure 1B:
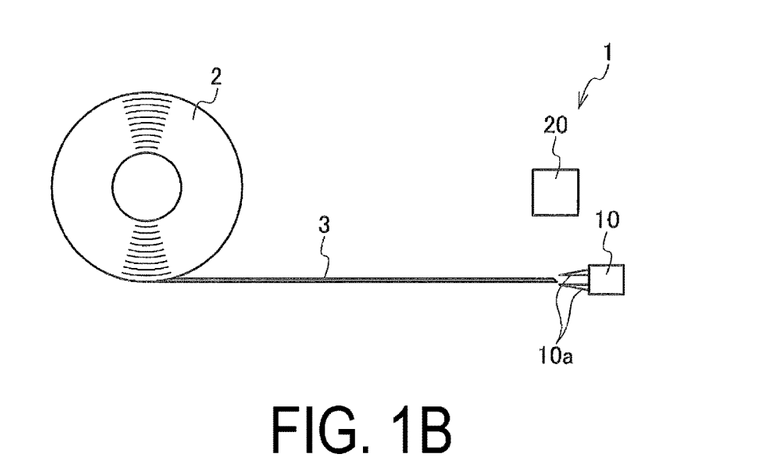
FIG. 1B is a side view of the main parts of the cutting device.
Figure 2:
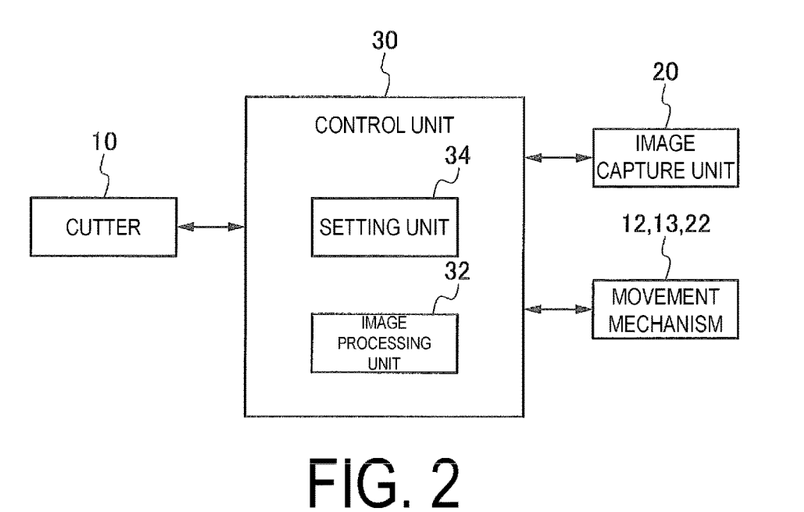
FIG. 2 is a block diagram illustrating a control unit provided in the cutting device illustrated in FIGS. 1A and 1B.

A method for manufacturing a band-like cut member, and a cutting device for a band-like member, according to an embodiment will be described hereinafter. FIG. 1A is a plan view of a cutting device 1 for a band-like member according to an embodiment, which is subjected to the method for manufacturing a band-like cut member according to an embodiment, and FIG. 1B is a side view of the cutting device 1. FIG. 2 is a block diagram illustrating a control unit provided in the cutting device 1.

The band-like member to be cut in the present embodiment is a sheet material, extending in one direction, in which a plurality of reinforcing cords are arranged mutually parallel and are embedded in rubber. The reinforcing cords are organic fiber cords or metal cords. The direction in which the reinforcing cords embedded in the band-like member extend is a length direction of the band-like member. A width direction of the band-like member is a direction orthogonal to the length direction of the band-like member, and thus is a direction orthogonal to the direction in which the reinforcing cords extend. In the present embodiment, the band-like cut member produced from the band-like member is suitable for use as a constituent member of a structural member, such as a constituent member of a tire.

The cutting device 1 includes a cutter (a cut forming mechanism) 10, an image capture unit 20, and a control unit 30 (see FIG. 2).

The cutter 10 is provided so as to be mobile in the width direction of a band-like member 3 drawn out from a band-like member wound body 2, and is configured to form cuts in one end of the band-like member 3 in the length direction thereof.

The image capture unit 20 is provided so as to be mobile in the width direction of the band-like member 3 drawn out from the band-like member wound body 2, and is arranged so as to capture an image of the one end of the band-like member 3 in the length direction thereof. Here, the end surface of the band-like member 3 whose image is captured is preferably an inclined surface, obtained by cutting the one end of the band-like member 3 in the length direction at an angle, such that cuts in an end surface of the band-like member 3 on one side in a thickness direction thereof are visible. As a result, the image capture unit 20 can be arranged on one side of the band-like member 3 in the thickness direction thereof so as to capture an image from one side of the band-like member 3 in the thickness direction thereof. Information of the number of reinforcing cords in the band-like member 3 can be obtained from an image captured in this manner. The cutting device 1 also includes a cutting blade (not illustrated) that cuts the band-like member 3, in which cuts have been formed, along the cuts so as to separate the band-like member 3 into a plurality of band-like cut members, and a take-up roller (not illustrated) that takes up, in a roll, the plurality of band-like cut members obtained from the cutting blade.

The cutter 10 has a pair of blades 10a that can be opened and closed in the thickness direction of the band-like member 3. The cutter 10 is supported by a frame 11 provided extending in the width direction of the band-like member 3, and the cutter 10 is moved in the width direction of the band-like member 3 by a width direction movement mechanism 12 provided on the frame 11. Additionally, a length direction movement mechanism 13, which moves the cutter 10 in the length direction of the band-like member 3, is provided on the frame 11. The cutter 10 is thus provided in front of the one end of the band-like member 3 in the length direction thereof, and the cutter 10 can be moved toward or retracted from the band-like member 3 by the length direction movement mechanism 13. As a result, the one end of the band-like member 3 in the length direction thereof enters between the pair of blades 10a, and a cut is formed in the one end of the band-like member 3 in the length direction thereof by then closing the pair of blades 10a. Note that the movement of the cutter 10 along the width direction of the band-like member 3 is adjusted on the basis of the image captured by the image capture unit 20 such that the cutter 10 is positioned at a rubber portion, between reinforcing cords, that can be cut.

The image capture unit 20 is constituted of a known CCD camera, for example. Captured image data from the image capture unit 20 is sent to the control unit 30. The image capture unit 20 is supported by a frame 21 provided extending in the width direction of the band-like member 3, and the image capture unit 20 is configured to move in the width direction of the band-like member 3 by a width direction movement mechanism 22 provided on the frame 21.

The control unit 30 is a unit that counts the number of reinforcing cords by processing the captured image data sent from the image capture unit 20. The control unit 30 also sets a cutting position on the band-like member 3 (a position where a cut is to be formed) and controls the operations of the width direction movement mechanism 12, the length direction movement mechanism 13, and the width direction movement mechanism 22 on the basis of the set cutting position. The control unit 30 is constituted of a computer, for example. In this case, the setting of the cutting position in the band-like member 3 (that is, the position where the cut is to be formed) is preferably executed by the computer. The processing of the captured image data and the counting of the number of reinforcing cords are preferably executed by the computer as well. In this case, these processes are carried out by software.

Specifically, the control unit 30 includes an image processing unit 32 and a setting unit 34.

By image processing the captured image data sent from the image capture unit 20, the image processing unit 32 enhances the cut faces of the reinforcing cords; then, by counting the number of cut faces of the reinforcing cords, the number of reinforcing cords in the band-like member 3 is counted.

The setting unit 34 sets the cutting position, through a method that will be described below, on the basis of the counted number of the band-like member 3.

Figure 3:
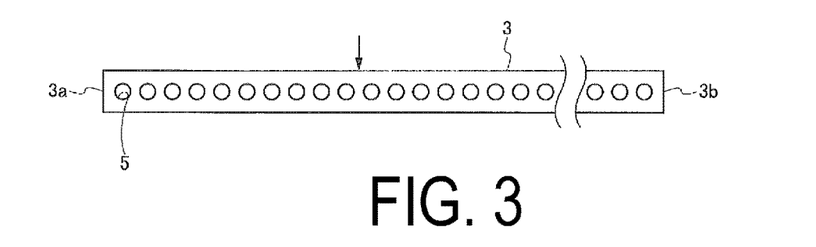
FIG. 3 is a diagram illustrating cutting of a band-like member by the cutting device illustrated in FIGS. 1A and 1B.

FIG. 3 is a diagram illustrating cutting of the band-like member 3 by the cutting device 1. The cutting device 1 produces (N+1) band-like cut members by cutting the band-like member 3 a predetermined number of times N (where N is a natural number) along the length direction of the reinforcing cords, or in other words, by making cuts at N cutting positions. At this time, a plurality of cutting positions are set for the band-like member 3, from a first end 3a toward a second end 3b in the width direction of the band-like member 3, which is orthogonal to the length direction of the reinforcing cords in the band-like member 3. In the example illustrated in FIG. 3, a cutting position is set in the rubber part between 10th and 11th reinforcing cords 5, counted from the first end 3a. The cutter 10 then forms a cut at this cutting position. As will be described below, this cutting position is set in advance, on the basis of information of the total number of reinforcing cords 5 embedded in the band-like member 3, such that the number of reinforcing cords 5 in the band-like cut member is a predetermined number. Preferably, the information of the total number of reinforcing cords 5 is obtained using an image of the cut faces of the reinforcing cords captured by the image capture unit 20.

The band-like member 3 is formed of a material in which reinforcing cords are covered with unvulcanized rubber, in the shape of a band having a thickness dimension of several mm, a width dimension of approximately 240 mm, and a length dimension of several tens of m. For example, 240 reinforcing cords 5 are embedded in the band-like member 3 and substantially parallel to each other. Each of the reinforcing cords 5 is disposed approximately every 1 mm, for example. The reinforcing cords 5 are constituted of organic fiber cords such as polyester and nylon or metal cords such as steel cords.

Figure 4:
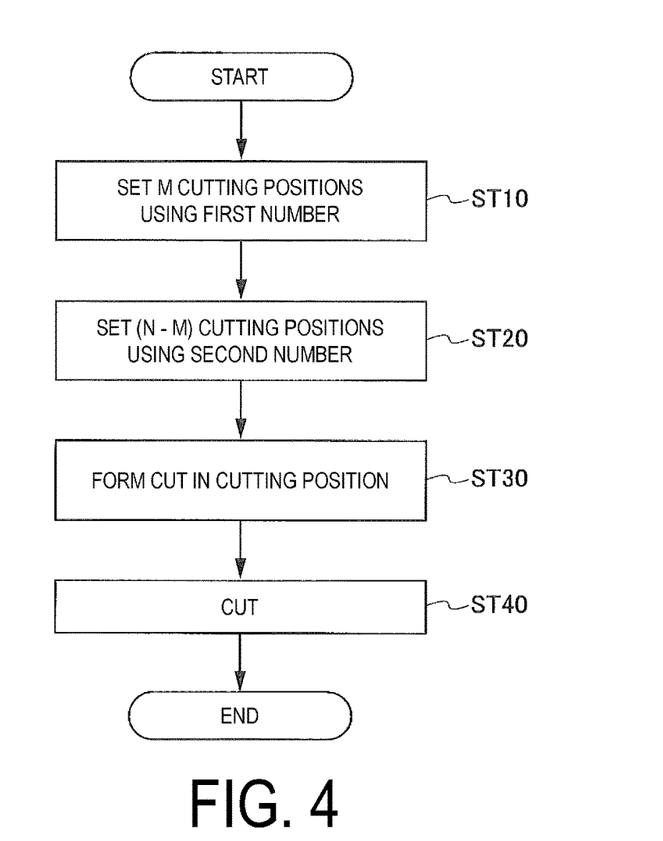
FIG. 4 is a diagram illustrating the flow of a method for manufacturing a band-like cut member according to an embodiment.

In the present embodiment, the cutting positions in the band-like member 3 are set through the following method, for example, and the band-like member 3 is then cut. FIG. 4 is a diagram illustrating the flow of a method for manufacturing a band-like cut member according to the present embodiment. A plurality of cutting positions are set for the band-like member 3, from the first end 3a toward the second end 3b in the width direction of the band-like member 3, which is orthogonal to the length direction of the reinforcing cords in the band-like member 3, and cuts are formed in the band-like member 3 at the set cutting positions. When the cutting positions in the band-like member 3 are set, the following processes are carried out. These are a process of setting M (where M is a natural number less than N) cutting positions in the band-like member 3 for every fixed first number of reinforcing cords 5 (step A; step ST10), and a process of setting a second number of the reinforcing cords 5 within an allowable number range, and setting the cutting positions at (N−M) locations in the band-like member 3 using the second number such that band-like cut members having the second number of reinforcing cords 5 are continuously produced (step B; step ST20). Note that "band-like cut members having the second number of reinforcing cords 5 being continuously produced" means that (N−M+1) band-like cut members are produced from the (N−M) cutting positions in step B, and the number of reinforcing cords 5 in all of the band-like cut members, from the first band-like cut member produced in step B to the last band-like cut member produced in step B, is the second number. After this, the cutter 10 moves to the set cutting positions and forms cuts at the cutting positions (step ST30). Then, using the cutting blade of the cutting device 1, the band-like member 3 in which the cuts have been formed is cut so as to separate the band-like member 3 along the cuts (step ST40).

In the example illustrated in FIG. 3, in the step A, the first number is set to 10, and the process of counting the reinforcing cords 5 and setting a cutting position in the band-like member 3 every 10 cords is repeated M times. In other words, M cutting positions are set. Meanwhile, in the step B, in the case where the allowable number range of reinforcing cords 5 central to the first number is from 9 to 11, the second number is set to a range from 9 to 11. Cutting positions are then set (N–M) times in the band-like member 3, or in other words, are set at (N–M) positions, using the second number, such that the band-like cut members having the second number of reinforcing cords 5 are continuously produced. "Allowable number range" refers to a range for the number of reinforcing cords 5 that is allowable while ensuring characteristics (durability and strength, for example) of the structural member in which the band-like cut members are employed.

These cutting positions in the processes of step A and step B are set by the control unit 30 on the basis of the information of the total number of reinforcing cords 5 in the band-like member 3, which has been obtained in advance.

Figure 5:
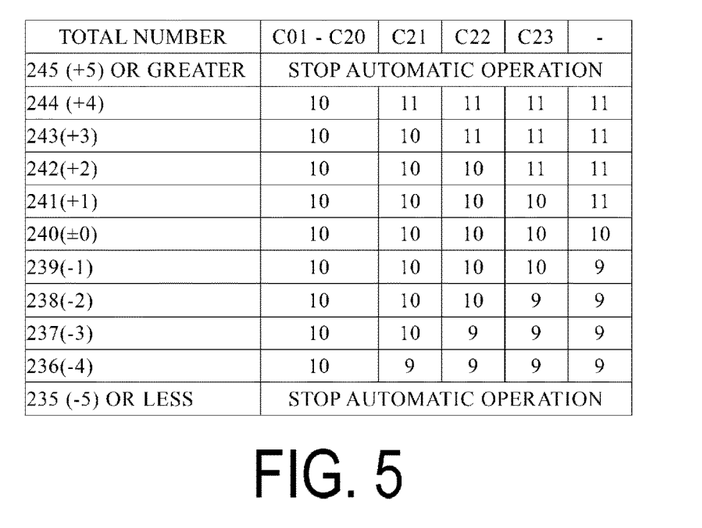
FIG. 5 is a diagram illustrating an example of a reference table held by a setting unit illustrated in FIG. 2.

FIG. 5 is a diagram illustrating an example of a reference table held by the setting unit 34. The setting unit 34 holds a reference table in which the above-described information of M is set, as well as the first number used in step A and the second number used in step B for each total number of reinforcing cords 5 in the band-like member 3. By referring to the reference table, the setting unit 34 sets the first number and the second number, and then sets the cutting positions using the first number and the second number. As illustrated in FIG. 5, the reference table indicates the first number and the second number used to determine cutting positions C01 to C23.

In the example illustrated in FIG. 5, to produce 24 band-like cut members, 23 cutting positions (C01 to C23) are set in the band-like member 3 and the first number is set to 10. The allowable number range for the reinforcing cords 5 is set to from 9 to 11. The number of times M in which the setting of the cutting positions is repeated in step A is set to 20 times. In other words, M cutting positions are set. The cutting positions C21 to C23 are the cutting positions used in step B.

As illustrated in FIG. 5, when the total number of reinforcing cords 5 in the band-like member 3 is from 236 to 244, the first number and the second number are assigned for C01 to C20 and C21 to C23 as indicated in the reference table. Based on this, the cutting positions C01 to C20 are set in order from the first end 3a of the band-like member 3. The cutting positions C01 to C20 are positions set every 10 reinforcing cords 5, counting from the first end 3a. Then, the cutting positions C21 to C23 are set using the second number, which is 9, 10, or 11. The cutting positions C21 to C23 are positions set every second number, counting the reinforcing cords 5 in order from the last cutting position used in step A. In FIG. 5, the "–" column to the right of the column for C23 indicates the number of reinforcing cords 5 in the last band-like cut member produced in step B. In the example illustrated in FIG. 5, this is from 9 to 11 cords, both of which correspond to the second number within the allowable number range.

In this manner, the setting unit 34 sets the cutting positions using the total number of reinforcing cords 5 while referring to the reference table. Using the images obtained by the image capture unit 20 and processed by the image processing unit 32, the number of reinforcing cords 5 is counted from the immediately-previous cutting position. The rubber part between the reinforcing cord corresponding to the first number or the second number therefrom, and the reinforcing cord adjacent to the second end 3b side of that reinforcing cord, corresponds to the actual cutting position in the band-like member 3.

The example enclosed in the bold frame in FIG. 5 indicates that the total number of reinforcing cords 5 is 242. Thus the cutting positions are set in the band-like member 3 such that at cutting positions C01 to C20, where the process of step A is carried out, the first number is 10, whereas at cutting positions C21 to C23, where the process of step B is carried out, the second number is 10 at C21 and C22 and 11 at C23. In other words, the second number is variable in step B. The setting unit 34 sets the N cutting positions using the first number and the second number in this manner. At this time, the second number used in the process of step B varies within the predetermined allowable number range, and some of the instances of the second number can be set to the same number as the first number.

Additionally, in the example illustrated in FIG. 5, the cutting method according to the present embodiment is not carried out in the case where the total number of reinforcing cords 5 is greater than or equal to 245 or less than or equal to 235. For example, cutting positions are set every 10 reinforcing cords and the last band-like cut member obtained is discarded. Thus although cases where the last band-like cut member obtained is discarded do arise under conditions where the number of reinforcing cords 5 is extremely far from the target number, the chance of such conditions arising is extremely low and only an extremely small amount of band-like cut members will thus be discarded.

Figure 6A:
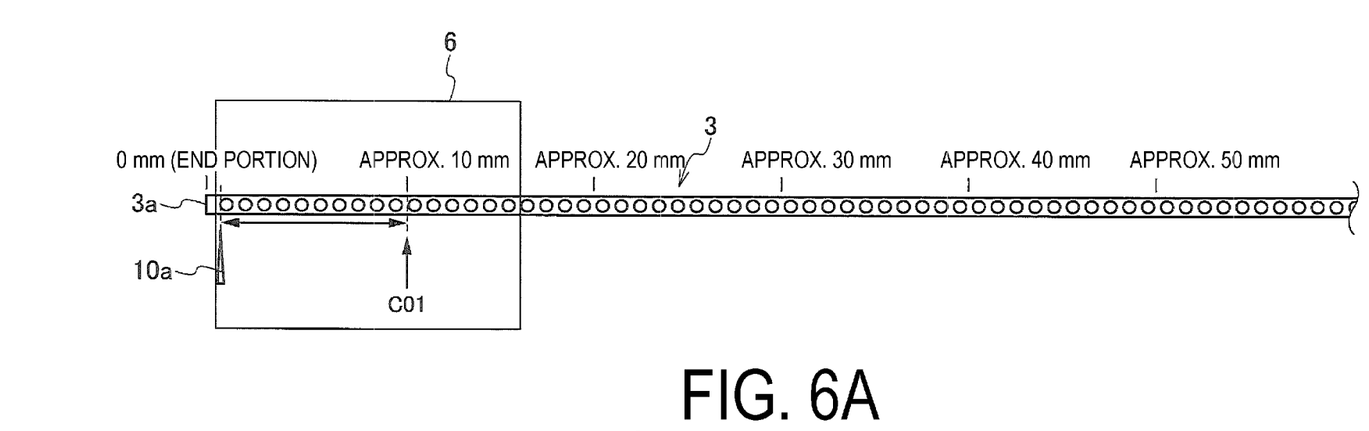
FIGS. 6A and 6B are diagrams illustrating a specific flow of a process of forming cuts at cutting positions.
Figure 6B:
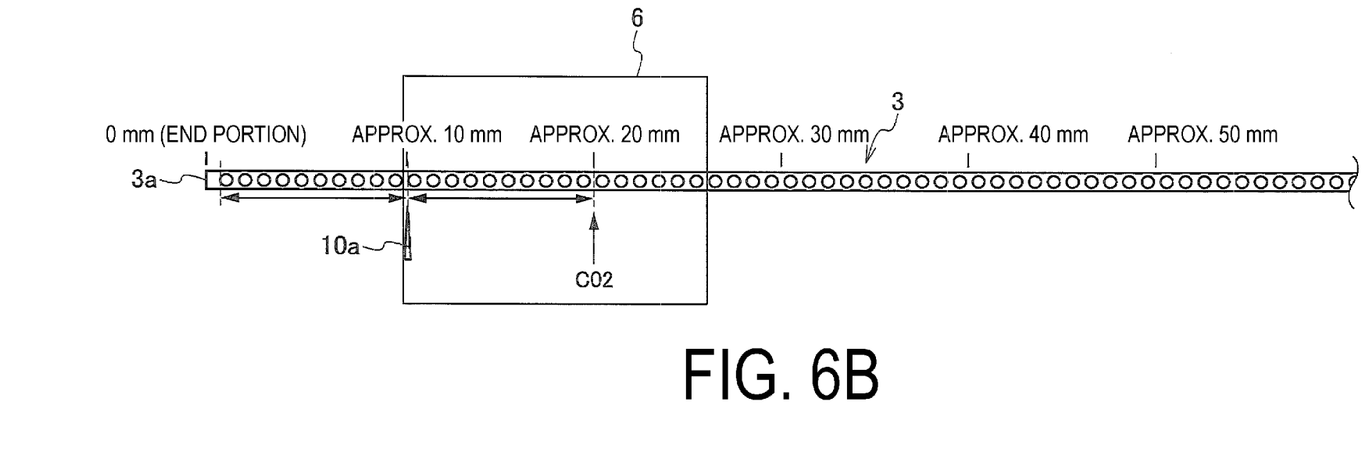

FIGS. 6A and 6B are diagrams illustrating a specific flow of the process of forming cuts at the cutting positions. First, the blades 10a are positioned at the end of the reinforcing cord 5 on the first end 3a side. Then, using the first number of 10, the setting unit 34 specifies a region between the 10th reinforcing cord and the 11th reinforcing cord counted from that position as the location of the cutting position C01 in the band-like member 3. At this time, the cutting position C01 is within an image capture range 6 of the image capture unit 20, and thus the setting unit 34 can set the cutting position C01 in the band-like member 3. The location of the cutting position C01 may be anywhere as long as it is in the rubber part between the 10th reinforcing cord and the 11th reinforcing cord. The setting unit 34 calculates the distance of the cutting position C01 from the first end 3a using the captured image, and uses that distance to set a destination position of the blades 10a. As a result, the blades 10a can move to the cutting position C01 and can form a cut at the cutting position C01. Then, the image capture unit 20 is moved such that the cutting position C01 is located at the left end of the image capture range 6 indicated in the drawing. Then, using the first number of 10, the setting unit 34 specifies a region between the 10th reinforcing cord and the 11th reinforcing cord counted from the cutting position C01 as the location of the cutting position C02 in the band-like member 3. At this time, the cutting position C02 is within the image capture range 6 of the image capture unit 20, and thus the setting unit 34 can specify the cutting position C02 in the band-like member 3. The setting unit 34 furthermore calculates a distance of the cutting position C02 from the cutting position C01 using the captured image. The setting unit 34 then sets a destination position of the blades 10a using the calculated distance of the cutting position C02 from the cutting position C01. As a result, the blades 10a can move to the cutting position C02 and can form a cut at the cutting position C02. In this manner, cuts can be formed at the set cutting positions while the image capture unit 20 and the blades 10*a* are moved. In step B, where cutting is carried out using the second number, the cutting is carried out through the above-described method.

As described above, in the present embodiment, the process of step A and the process of step B are used together. Thus, even if the total number of reinforcing cords 5 in the band-like member 3 is not a natural multiple of the first number, the second number can be set within the allowable number range for the reinforcing cords 5 in the process of step B. At this time, the number of reinforcing cords present in the last band-like cut member produced from the part of the band-like member to which step B is applied can also be set to the second number within the allowable number range. As such, even in the case where the number of reinforcing cords 5 in the band-like member 3 deviates from the target number of cords, it is unlikely that the last band-like cut member produced cannot be used as a tire member and will be subject to discarding. In other words, with the method for manufacturing a band-like cut member according to the present embodiment, a situation in which a member to be discarded is produced can be suppressed.

In the present embodiment, the process of step A is carried out before the process of step B, but the order these processes are carried out is not limited thereto. For example, the process of step A may be carried out after the process of step B. Alternatively, the process of step A may be carried out both before and after the process of step B. In these cases as well, the process of step A and the process of step B are used together. Thus, even if the total number of reinforcing cords 5 in the band-like member 3 is not a natural multiple of the first number, the second number can be set within the allowable number range for the reinforcing cords 5 in the process of step B. As a result, the last band-like cut member produced can be brought within the above-described allowable number range. As such, even in the case where the number of reinforcing cords 5 in the band-like member 3 deviates from the target number of cords, it is unlikely that the last band-like cut member produced cannot be used as a tire member and will be subject to discarding.

In the present embodiment, the total number of reinforcing cords 5 in the band-like member 3 is counted before setting the cutting positions in the band-like member 3. For example, the total number of reinforcing cords 5 can be counted by the image capture unit 20 capturing an image of the reinforcing cords 5. In this case, the second number is preferably set on the basis of a difference between the total number of reinforcing cords 5 embedded in the band-like member 3, and the product of the first number and (N+1). N is the number of times the band-like member is cut. In the example illustrated in FIG. 5, the first number is 10 and N is 23, and thus the aforementioned product is 240 (10×(23+1)). Accordingly, using the difference between the total number of reinforcing cords 5 in the band-like member 3 and the aforementioned 240, the second number is set to 10 at C21 and C22 and to 11 at C23. As a result, the number of reinforcing cords in the last band-like cut member is 11, which is within the allowable number range. In this manner, the aforementioned difference is absorbed by the number of reinforcing cords in the final two band-like cut members.

When, instead of the configuration of the present embodiment, the process of step A is carried out before the process of step B, before setting the cutting positions in the band-like member 3, the number of reinforcing cords 5 embedded in the part of the band-like member to which the process of step B is applied is preferably counted to find the number of reinforcing cords 5 in that part, and the second number then is preferably set on the basis of the number of reinforcing cords 5 found in that part. In the case where the total number of reinforcing cords in the band-like member 3 is 242, there will be 42 reinforcing cords 5 embedded in the part of the band-like member to which the process of step B is applied. Thus the second number can also be set on the basis of this number.

In both of the above-described configurations, even in the case where the number of reinforcing cords 5 in the band-like member 3 deviates from the target number of cords, it is possible to prevent a situation in which the last band-like cut member produced cannot be used as a tire member and will be subject to discarding.

Note that in the case where the second number used in the process of step B varies within the predetermined allowable number range, and the number of reinforcing cords in the part of the band-like member 3 to which the process of step B is applied is greater than the product of N−M+1 and the first number, the initial second number used for setting the first cutting position in the process of step B is preferably less than the number of reinforcing cords 5 present in the last band-like cut member produced as a result of the last cutting position being set in the process of step B. Even in this case, the number of reinforcing cords 5 present in the last band-like cut member will be the second number too. The "last band-like cut member" means the band-like cut member having the number of reinforcing cords 5 indicated in the "−" column to the right of the C23 column in FIG. 5. For example, in the example illustrated in FIG. 5, in the case where the number of reinforcing cords in the part of the band-like member 3 to which the process of step B is applied is 42, which is greater than the product of N−M+1 and the first number ((23−20+1)×10, or 40), the second number at C21 (10) is less than the number of reinforcing cords 5 present in the last band-like cut member (11), as illustrated in FIG. 5.

In the case where the number of reinforcing cords in the part of the band-like member 3 to which the process of step B is applied is greater than the product of N−M+1 and the first number, the initial second number used for setting the first cutting position in the process of step B is preferably greater than the number of reinforcing cords present in the last band-like cut member produced as a result of the last cutting position being set in the process of step B. The "last band-like cut member" means the band-like cut member having the number of reinforcing cords 5 indicated in the "−" column to the right of the C23 column in FIG. 5. In this case, the number of reinforcing cords 5 present in the last band-like cut member will be the second number too. For example, in the example illustrated in FIG. 5, in the case where the number of reinforcing cords in the part of the band-like member 3 to which the process of step B is applied is 38 (the total number being 238), which is less than the product of N−M+1 and the first number ((23−20+1)×10, or 40), the second number at C21 (10) is greater than the number of reinforcing cords 5 present in the last band-like cut member (9), as illustrated in FIG. 5.

In this manner, adjusting the cutting positions using the second number makes it possible to manage a plurality of take-up rollers, which take up the band-like cut members in which the second number is different from the first number, as a separate group. Thus in the case where belt-edge reinforcing layers are produced by individually wrapping band-like cut members serving as tire members on both sides in the tire width direction, a situation in which a band-like cut member containing 10 reinforcing cords is used on one side and a band-like cut member containing 11 reinforcing cords is used on the other side can be prevented.

This makes it possible to prevent imbalance in the rigidity between the both sides of the tire in the tire width direction.

In the present embodiment, in the case where the second number used in the process of step B varies within the predetermined allowable number range, and a difference between the number of reinforcing cords in the part of the band-like member 3 to which step B is applied and the product of N−M+1 and the first number is not a multiple of N−M+1, the initial second number used for setting the first cutting position in step B is preferably different from the number of reinforcing cords present in the last band-like cut member produced as a result of the last cutting position being set in step B. In this case, the number of reinforcing cords 5 present in the last band-like cut member will be the second number too. For example, in the example enclosed in the bold frame in FIG. 5, in the case where the number of reinforcing cords in the part of the band-like member 3 to which the process of step B is applied is 42, and the product of N−M+1 and the first number is 40 ((23−20+1)×10), the difference is 2 (42−40), and N−M+1 is 4 (23−20+1). In other words, the aforementioned difference is 2, which is not a multiple of N−M+1. Here, the second number at C21 (10) is different from the number of reinforcing cords 5 present in the last band-like cut member (11), as indicated in FIG. 5.

Additionally, in step B of the present embodiment, when k1 represents a natural number greater than or equal to 2 and less than or equal to N−M−1, the values of the second number used to set the cutting positions from the first cutting position to the k1th cutting position in step B are preferably the same. Specifically, in the example enclosed in bold in FIG. 5, the values of the second number used to set the second cutting position C22 and the first cutting position C21 in step B are the same number, namely 10. By setting the second number to the same number continuously in this manner, the same number of band-like cut members can be managed as a group, and band-like cut members having the same number of reinforcing cords can be efficiently used as tire members.

The k1, which represents a maximum value of the number at which the second number has the same value, is preferably set in accordance with a difference between the number of reinforcing cords in the part of the band-like member to which step B is applied, and the product of N−M+1 and the first number. For example, in the case where a difference obtained by subtracting the product of N−M+1 and the first number from the number of reinforcing cords in the part of the band-like member to which step B is applied is positive, the second number for setting the (k1+1)th and subsequent cutting positions is given a greater value than the second number for setting the k1th and previous cutting positions. Meanwhile, in the case where the above-described difference is negative, the second number for setting the (k1+1)th and subsequent cutting positions is given a smaller value than the second number for setting the k1th and previous cutting positions. At this time, preferably, 1 is set higher as the absolute value of the above-described difference increases.

Furthermore, in step B, the values of the second number used to set the cutting positions from the first cutting position to the k1th cutting position in step B are preferably the same as the first number.

Meanwhile, when k2 represents a natural number greater than or equal to 1 and less than or equal to N−M−2, the values of second number used to set the (k2+1)th and subsequent cutting positions are preferably the same as each other, but are preferably different from the value of the second number used to set the first cutting position in step B. The aforementioned k2 is preferably set in accordance with a difference between the number of reinforcing cords in the part of the band-like member to which step B is applied, and the product of N−M+1 and the first number. For example, in the case where a difference obtained by subtracting the product of N−M+1 and the first number from the number of reinforcing cords in the part of the band-like member to which step B is applied is positive, the second number for setting the (k2+1)th and subsequent cutting positions is given a greater value than the second number for setting the k2th and previous cutting positions. Meanwhile, in the case where the above-described difference is negative, the second number for setting the (k2+1)th and subsequent cutting positions is given a smaller value than the second number for setting the k2th and previous cutting positions. At this time, k2 is preferably set greater as the absolute value of the above-described difference increases. In the example enclosed in bold in FIG. 4, the values of the second number used to set the second cutting position C22 and the first cutting position C21 in step B are all 10, which is the same as the first number, which is 10 as well. On the other hand, the second number used to set the third and subsequent cutting positions is 11, and this second number is different from 10, which is the second number used to set the cutting positions C21 and C22.

By setting the first number or the second number continuously in this manner, the same number of band-like cut members can be managed as a group, and band-like cut members having the same number of reinforcing cords can be efficiently used as tire members.

Additionally, in the present embodiment, the difference between the second number and the first number is preferably less than or equal to 15% of the first number. In this range, the band-like cut members can function effectively as belt reinforcing layers in the case where the band-like cut members are used as belt reinforcing layers, which are tire members.

Additionally, in the present embodiment, the above-described M is preferably a natural number greater than or equal to 50% and less than or equal to 90% of N. In this range, the second number can be effectively set within the allowable number range for the reinforcing cords even when the number of reinforcing cords embedded in the band-like member varies.

The foregoing has been a detailed description of the method for manufacturing a band-like cut member and a cutting device for a band-like member according to the present technology. However, the present technology is not limited to the above embodiment, and may of course be improved or modified in various ways without departing from the essential spirit of the present technology.

The invention claimed is:

1. A method for controlling a cutting machine that manufactures band-like cut members from a band-like member, the cutting machine being controlled by a computer, the method comprising the steps of:

counting a number of a plurality of reinforcing cords arranged mutually parallel and embedded in rubber of a band-like member using the computer, by capturing an image of cut faces of the plurality of reinforcing cords;

setting N, where N is a predetermined positive integer, cutting positions in the band-like member using the computer on a basis of a count result of the number of the plurality of reinforcing cords, from a first end toward a second end in a width direction of the band-like member, the width direction being orthogonal to a length direction of the plurality of reinforcing cords in the band-like member;

forming cuts in the band-like member on the basis of the cutting positions in order to produce (N+1) band-like cut members by the cutting machine that cuts the band-like member along the length direction of the plurality of reinforcing cords at the N cutting positions, wherein the step of using the computer for setting the cutting positions in the band-like member includes:

a step A of setting M, where M is a positive integer less than N, cutting positions in the band-like member every first number of reinforcing cords of the plurality of reinforcing cords, the first number being a predetermined fixed number; and a step B of setting a second number within an allowable number range of the plurality of reinforcing cords that is predetermined and setting (N−M) cutting positions in the band-like member every second number such that band-like cut members having the second number of reinforcing cords of the plurality of reinforcing cords are continuously produced, the positive integer M and the second number being set such that an addition of a product of the first number and the positive integer M, and a sum of the second number set for each of the band-like cut members to which the step B is applied corresponds to a total number of the plurality of reinforcing cords embedded in the entire band-like member.

2. The method according to claim 1, wherein the cutting positions in the step B are set such that a number of reinforcing cords of the plurality of the reinforcing cords present in a last band-like cut member produced from a part of the band-like member to which the step B is applied is the second number.

3. The method according to claim 1,
wherein the second number is set on the basis of a difference between a total number of the plurality of reinforcing cords embedded in the band-like member, and a product of the first number and the (N+1).

4. The method according to claim 1, wherein
the step A is carried out before the step B; and
before the cutting positions are set in the band-like member, a number of reinforcing cords of the plurality of reinforcing cords embedded in a part of the band-like member to which the step B is applied is counted to find the number of reinforcing cords in the part using the computer, by capturing the image of the cut faces of the plurality of reinforcing cords, and the second number is set on the basis of the number of reinforcing cords in the part that is found.

5. The method according to claim 1, wherein the second number used in the step B is variable within an allowable number range, and some value of the second number is identical to the first number.

6. The method according to claim 1, wherein
the second number used in the step B is variable within an allowable number range; and
in the case where a number of reinforcing cords of the plurality of reinforcing cords in a part of the band-like member to which the step B is applied is greater than a product of N−M+1 and the first number, an initial value of the second number used to set a first cutting position in the step B is less than a number of reinforcing cords of the plurality of reinforcing cords present in a last band-like cut member produced as a result of the last cutting position in the step B being set.

7. The method according to claim 1, wherein
the second number is variable within the allowable number range; and
in the case where a number of reinforcing cords of the plurality of reinforcing cords in a part of the band-like member to which the step B is applied is less than the product of N−M+1 and the first number, an initial value of the second number used to set a first cutting position in the step B is greater than a number of reinforcing cords of the plurality of reinforcing cords present in a last band-like cut member produced as a result of the last cutting position in the step B being set.

8. The method according to claim 1, wherein
the second number is variable within an allowable number range; and
in the case where a difference between a number of reinforcing cords of the plurality of reinforcing cords in a part of the band-like member to which the step B is applied, and a product of N−M+1 and the first number, is not a multiple of N−M+1, an initial value of the second number used to set a first cutting position in the step B is different from a number of reinforcing cords of the plurality of reinforcing cords present in a last band-like cut member produced as a result of a last cutting position in the step B being set.

9. The method according to claim 1, wherein when k1 is a natural number greater than or equal to 2 and less than or equal to N−M−1 in the step B, the second number used to set the cutting positions from a first cutting position to the k1th cutting position in the step B is identical.

10. The method according to claim 9, wherein in the step B, the second number used to set the cutting positions from the first cutting position to the k1th cutting position in the step B is identical to the first number.

11. The method according to claim 9, wherein the k1 is set in accordance with a difference between a number of reinforcing cords of the plurality of reinforcing cords in a part of the band-like member to which the step B is applied, and a product of N−M+1 and the first number.

12. The method according to claim 1, wherein when k2 is a natural number greater than or equal to 1 and less than or equal to N−M−2 in the step B, values of the second number used to set the (k2+1)th and subsequent cutting positions are identical each other, but are different from a value of the second number used to set a first cutting position in the step B.

13. The method according to claim 1, wherein the step A is carried out before the step B, after the step B, or before and after the step B.

14. The method according to claim 1, wherein a difference between the second number and the first number is less than or equal to 15% of the first number.

15. The method according to claim 1, wherein the M is a natural number greater than or equal to 50% of the N and less than or equal to 90% of the N.

16. The method according to claim 1, wherein the second number is set by referring to a reference table held in the computer, the reference table setting information of the M, as well as the first number and the second number for each of a total number of the plurality of reinforcing cords in the band-like member.

17. The method according to claim 1, wherein the counting and the use of the first and second numbers, the value of M, and the reference table results in more efficient cutting of the band-like member to avoid waste.

18. A cutting device for a band-like member, the device comprising:

a computing device configured to count a number of a plurality of reinforcing cords arranged mutually parallel and embedded in rubber of a band-like member by capturing an image of cut faces of the plurality of reinforcing cords, and set N, where N is a predetermined positive integer, cutting positions in a band-like member on a basis of a count result of the number of the plurality of reinforcing cords, from a first end toward a second end in a width direction of the band-like member, the width direction being orthogonal to a length direction of the plurality of reinforcing cords in the band-like member; and a cut forming mechanism configured to form cuts in the band-like member on the basis of the cutting positions in order to produce (N+1) band-like cut members by cutting the band-like member along the length direction of the plurality of reinforcing cord at the N cutting positions, wherein in order to set M, where M is a positive integer less than N, cutting positions in the band-like member every first number of the plurality of reinforcing cords that is a predetermined fixed number using the computing device, and in order to furthermore set a second number within an allowable number range of the plurality of reinforcing cords that is predetermined and set (N−M) cutting positions in the band-like member every second number such that band-like cut members having the second number of reinforcing cords of the plurality of reinforcing cords are continuously produced using the computing device, the computing device holds a reference table that sets information of the M, as well as the first number and the second number for each of a total number of the plurality of reinforcing cords in the band-like member, the positive integer M and the second number being set such that an addition of a product of the first number and the positive number M, and a sum of the second number set for each of the band-like cut members to which the step B is applied corresponds to a total number of the plurality of reinforcing cords embedded in the band-like member.

19. The device according to claim 18, wherein when (N−M+1) band-like cut members are produced from the (N−M) cutting positions, the computing device sets the (N−M) cutting positions such that a number of reinforcing cords of the plurality of reinforcing cords present in a last band-like cut member is the second number.

20. The device according to claim 18, wherein counting the number of the plurality of reinforcing cords and the use of the first and second numbers, the value of M, and the reference table results in more efficient cutting of the band-like member to avoid waste.

* * * * *